United States Patent
Maruyama

(10) Patent No.: US 8,336,690 B2
(45) Date of Patent: Dec. 25, 2012

(54) POWER TRANSMISSION APPARATUS

(75) Inventor: Tetsuya Maruyama, Nishio (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 723 days.

(21) Appl. No.: 12/506,821

(22) Filed: Jul. 21, 2009

(65) Prior Publication Data

US 2010/0025176 A1    Feb. 4, 2010

(30) Foreign Application Priority Data

Jul. 30, 2008  (JP) ................................. 2008-196427

(51) Int. Cl.
*F16D 23/06* (2006.01)
(52) U.S. Cl. ................................. 192/53.343
(58) Field of Classification Search ............ 192/53.341, 192/53.343; 74/339
See application file for complete search history.

(56) References Cited

U.S. PATENT DOCUMENTS

| | | | | |
|---|---|---|---|---|
| 3,366,208 A | * | 1/1968 | Kelbel | 192/53.343 |
| 3,618,724 A | * | 11/1971 | Oehl | 192/53.343 |
| 5,641,045 A | * | 6/1997 | Ogawa et al. | 192/53.341 |
| 6,547,052 B1 | * | 4/2003 | Schwuger et al. | 192/53.34 |
| 6,554,114 B2 | * | 4/2003 | Lee | 192/53.343 |
| 6,994,196 B2 | * | 2/2006 | Shimura | 192/53.343 |

FOREIGN PATENT DOCUMENTS

| | | |
|---|---|---|
| DE | 1190267 B | 4/1965 |
| DE | 1555158 A1 | 1/1971 |
| FR | 2803640 A1 | 7/2001 |
| JP | 2006-057717 A | 3/2006 |
| JP | 2007-292151 A | 11/2007 |

OTHER PUBLICATIONS

European Search Report in corresponding EP Application No. 09009685, dated Oct. 1, 2012.

* cited by examiner

*Primary Examiner* — David D Le
*Assistant Examiner* — Huan Le
(74) *Attorney, Agent, or Firm* — Buchanan Ingersoll & Rooney

(57) ABSTRACT

A power transmission apparatus includes a first power transmitting member, a second power transmitting member, a synchronizer ring, arranged between the first power transmitting member and the second power transmitting member, a sleeve held at the first power transmitting member, a synchronizer key arranged between the first power transmitting member and the sleeve, and a drag restricting member arranged between the first power transmitting member and the sleeve. A synchronizer ring engaging portion is formed at a side of the drag restricting member facing the second power transmitting member so as to protrude in the radially inward direction, and a drag restricting engagement portion is formed at the outer circumferential surface of the synchronizer ring at a side thereof facing the first power transmitting member, the drag restricting engagement portion being engageable with the synchronizer ring engaging portion.

5 Claims, 5 Drawing Sheets

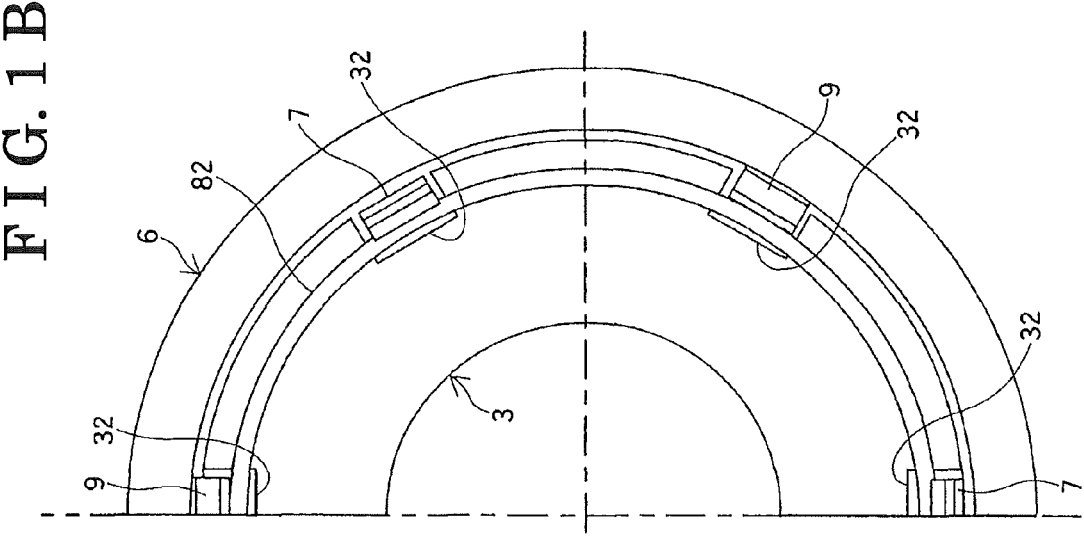
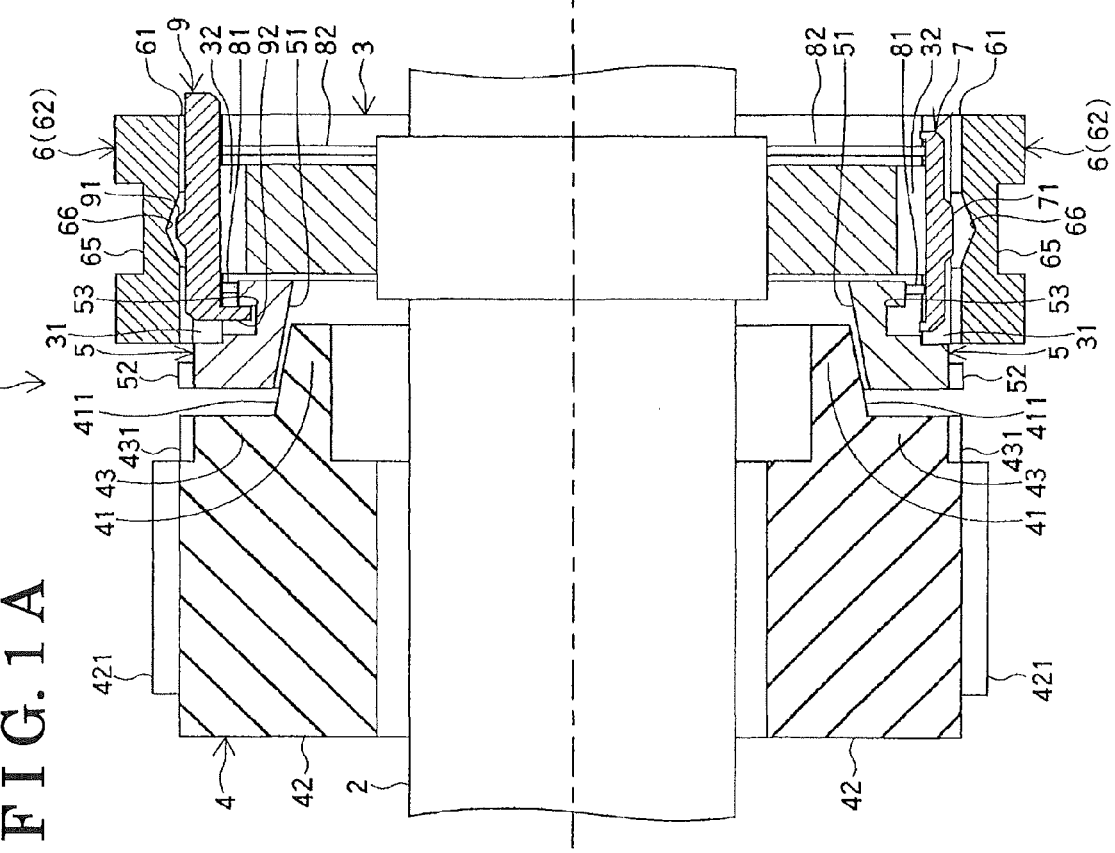

POWER TRANSMISSION APPARATUS

CROSS REFERENCE TO RELATED APPLICATIONS

This application is based on and claims priority under 35 U.S.C. §119 to Japanese Patent Application 2008-196427, filed on Jul. 30, 2008, the entire contents of which is incorporated herein by reference.

FIELD OF THE INVENTION

The present invention relates to a power transmission apparatus. More specifically, the present invention relates to a power transmission apparatus having a synchronizer ring (a synchronizing device).

BACKGROUND

A vehicle includes a power transmission apparatus for converting and outputting a torque of an internal combustion engine according to a driving condition. The power transmission apparatus includes a gear-type power transmission apparatus, a belt-type power transmission apparatus and the like. The gear-type power transmission apparatus, in which power transmission loss is small, is widely used.

The gear-type power transmission apparatus shifts gears (second power transmission members) for establishing a plurality of shift stages in order to output the inputted torque of the internal combustion engine according to the driving condition. The power transmission apparatus selects one of the gears for establishing the plurality of shift stages in order to shift to the selected gear.

The power transmission apparatus includes a synchronizer ring in order to perform a shift operation quickly and easily when the gears are shifted. The synchronizer ring includes a cup-shaped inner circumferential surface, formed into a taper-shape, which is engageable with a taper-shaped outer circumferential surface of a conical portion of the gear (alternatively, the cup-shaped inner circumferential surface is engageable with a taper-shaped outer circumferential surface of a gear piece, which integrally rotates with the gear). When rotation is synchronized in a manner where the outer circumferential surface of the conical portion of the gear and the cup-shaped inner circumferential surface of the synchronizer ring frictionally engage with each other, a synchronizing operation of the power transmission apparatus is completed, and then the gear becomes shiftable. A clearance is generated between the cup-shaped inner circumferential surface of the synchronizer ring and the outer circumferential surface of the conical portion of the gear in an axial direction and a radial direction of a rotational shaft, which is provided at the same side as axes of the synchronizer ring and the gear, so as to restrain contact therebetween when the synchronizing operation is not performed (i.e., when the synchronizer ring idly rotates). Therefore, when the synchronizer ring idly rotates, the synchronizer ring may be inclined due to rotation and its own weight. Because the gear rotates relative to the synchronizer ring, the cup-shaped inner circumferential surface of the inclining synchronizer ring may contact the outer circumferential surface of the conical portion, thereby causing a generation of dragging torque. When the dragging torque is generated, torque loss may occur, which decreases transmission efficiency. Further, the contacting surface may wear out and may be seized.

In order to restrain the contact between the cup-shaped inner circumferential surface of the synchronizer ring and the outer circumferential surface of the conical portion of the gear, various devices are introduced. For example, according to a synchronizer clutch mechanism, disclosed in JP2006-57717A (referred to as reference 1 hereinafter), generation of dragging torque due to contact between a cup-shaped inner circumferential surface of a synchronizer ring and an outer circumferential surface of a conical portion of a gear is restrained, in a manner where the synchronizer ring is stably held by means of a spring element attached to the synchronizer ring. Further, a synchromesh mechanism for a transmission, disclosed in JP2007-292151A (referred to as reference 2 hereinafter) includes a piece member, arranged between an inner circumferential surface of a synchronizer ring and an outer circumferential surface of a clutch hub (a first power transmitting member) in a radial direction, contacting the inner circumferential surface of the synchronizer ring, and generating biasing force for biasing the synchronizer ring in a radially outward direction, by means of centrifugal force action.

According to reference 1, however, a shape of the synchronizer ring is required to be modified minutely in order to attach the spring element to the synchronizer ring. Further, the spring element is not easily assembled because the spring element generates spring force. According to reference 2, the piece member biases one side of the synchronizer ring in an axial direction, from an inner circumferential surface of the synchronizer ring in a radially outward direction. Therefore, the synchronizer ring is likely to incline relative to the axial direction, and accordingly, the generation of the dragging torque due to the contact between the cup-shaped inner circumferential surface of the synchronizer ring and the outer circumferential surface of the conical portion of the gear, may not be restrained.

A need thus exists for a power transmission apparatus, which is not susceptible to the drawback mentioned above.

SUMMARY OF THE INVENTION

According to an aspect of the invention, a power transmission apparatus includes a first power transmitting member having a first engagement toothed portion at an outer circumferential surface thereof, a second power transmitting member including a taper-shaped conical portion and a sleeve engaging portion, the conical portion arranged at a side of the second power transmitting member facing the first power transmitting member and protruding toward the first power transmitting member so that a radius of an outer circumferential surface of the conical portion is set to decrease toward the first power transmitting member, and the sleeve engaging portion having a second engagement toothed portion at an outer circumferential surface thereof, a synchronizer ring arranged between the first power transmitting member and the second power transmitting member so as to be axially movable therebetween relative to the first power transmitting member and the second power transmitting member, including a cup-shaped inner circumferential surface, whose radius is set so to increase from the first power transmitting member toward the second power transmitting member and frictionally engaging with the outer circumferential surface of the conical portion, and having a third engagement toothed portion at a portion of an outer circumferential surface of the synchronizer ring at a side thereof facing the second power transmitting member, a sleeve held at the first power transmitting member so as to be axially slidable relative to the first power transmitting member, and having a fourth engagement toothed portion at an inner circumferential surface thereof, the fourth engagement toothed portion engageable with the first engagement toothed portion of the first power transmitting member, the third engagement toothed portion of the synchronizer ring and the second engagement toothed portion of the second power transmitting member, respectively, a synchronizer key arranged between the outer circumferential surface of the first power transmitting member and the inner circumferential surface of the sleeve so as to be axially movable but not to be rotatable relative to the sleeve, being thrust from an inner circumferential surface thereof toward the inner circumferential surface of the sleeve in a radially outward direction by means of biasing force of a first key-biasing member and a second key-biasing member, axially moving toward the second power transmitting member so as to thrust the synchronizer ring toward the second power transmitting member in accordance with a axial movement of the sleeve from the first power transmitting member to the second power transmitting member on the basis of an operation of shifting shift stages, and being thrust in a radially inward direction against the biasing force of the first key-biasing member and the second key-biasing member by means of the sleeve after rotation of the first power transmitting member and the second power transmitting member is synchronized, a drag restricting member arranged between the outer circumferential surface of the first power transmitting member and the inner circumferential surface of the sleeve so as to be axially movable relative to the sleeve while so as not to be rotatable relative to the sleeve, being thrust from an inner circumferential surface thereof toward the inner circumferential surface of the sleeve in the radially outward direction by means of the biasing force of the first key-biasing member and the second key-biasing member. A synchronizer ring engaging portion is formed at a side of the drag restricting member facing the second power transmitting member so as to protrude in the radially inward direction, and a drag restricting engagement portion is formed at the outer circumferential surface of the synchronizer ring at a side thereof facing the first power transmitting member, the drag restricting engagement portion being engageable with the synchronizer ring engaging portion.

According to another aspect of the invention, a power transmission apparatus includes a first power transmitting member having a first engagement toothed portion at an outer circumferential surface thereof, a second power transmitting member including a taper-shaped conical portion and a sleeve engaging portion, the conical portion arranged at a side of the second power transmitting member facing the first power transmitting member and protruding toward the first power transmitting member so that a radius of an outer circumferential surface of the conical portion decreases toward the first power transmitting member, and the sleeve engaging portion having a second engagement toothed portion at an outer circumferential surface thereof, a synchronizer ring arranged between the first power transmitting member and the second power transmitting member so as to be axially movable therebetween relative to the first power transmitting member and the second power transmitting member, including a cup-shaped inner circumferential surface, whose radius increases from the first power transmitting member toward the second power transmitting member and frictionally engaging with the outer circumferential surface of the conical portion, and having a third engagement toothed portion at a portion of an outer circumferential surface of the synchronizer ring facing the second power transmitting member, and a sleeve held at the first power transmitting member so as to be axially slidable relative to the first power transmitting member in an axial direction, and having a fourth engagement toothed portion at an inner circumferential surface thereof, the fourth engagement toothed portion engageable with the first engagement toothed portion of the first power transmitting member, the third engagement toothed portion of the synchronizer ring and the second engagement toothed portion of the second power transmitting member, respectively, and a drag restricting member arranged between the outer circumferential surface of the first power transmitting member and the inner circumferential surface of the sleeve so as to be axially movable but not to be rotatable relative to the sleeve, being thrust from an inner circumferential surface thereof toward the inner circumferential surface of the sleeve in a radially outward direction by means of biasing force of a first key-biasing member and a second key-biasing member, axially moving toward the second power transmitting member so as to thrust the synchronizer ring toward the second power transmitting member in accordance with a axial movement of the sleeve from the first power transmitting member to the second power transmitting member on the basis of an operation of shifting shift stages, and being thrust in a radially inward direction against the biasing force of the first key-biasing member and the second key-biasing member by means of the sleeve after rotation of the first power transmitting member and the second power transmitting member is synchronized. A synchronizer ring engaging portion is formed at a side of the drag restricting member facing the second power transmitting member so as to protrude in the radially inward direction, and a drag restricting engagement portion is formed at the outer circumferential surface of the synchronizer ring at a side thereof facing the first power transmitting member, the drag restricting engagement portion being engageable with the synchronizer ring engaging portion.

BRIEF DESCRIPTION OF THE DRAWINGS

The foregoing and additional features and characteristics of the present invention will become more apparent from the following detailed description considered with the reference to the accompanying drawings, wherein:

FIG. 1A is an explanation diagram illustrating a portion of a cross-section of a power transmission apparatus according to a first embodiment;

FIG. 1B is a diagram illustrating a configuration seen from a side where a gear is not shown in an axial direction, omitting clutch hub engagement teeth and sleeve engagement teeth;

DETAILED DESCRIPTION

Figure 2:
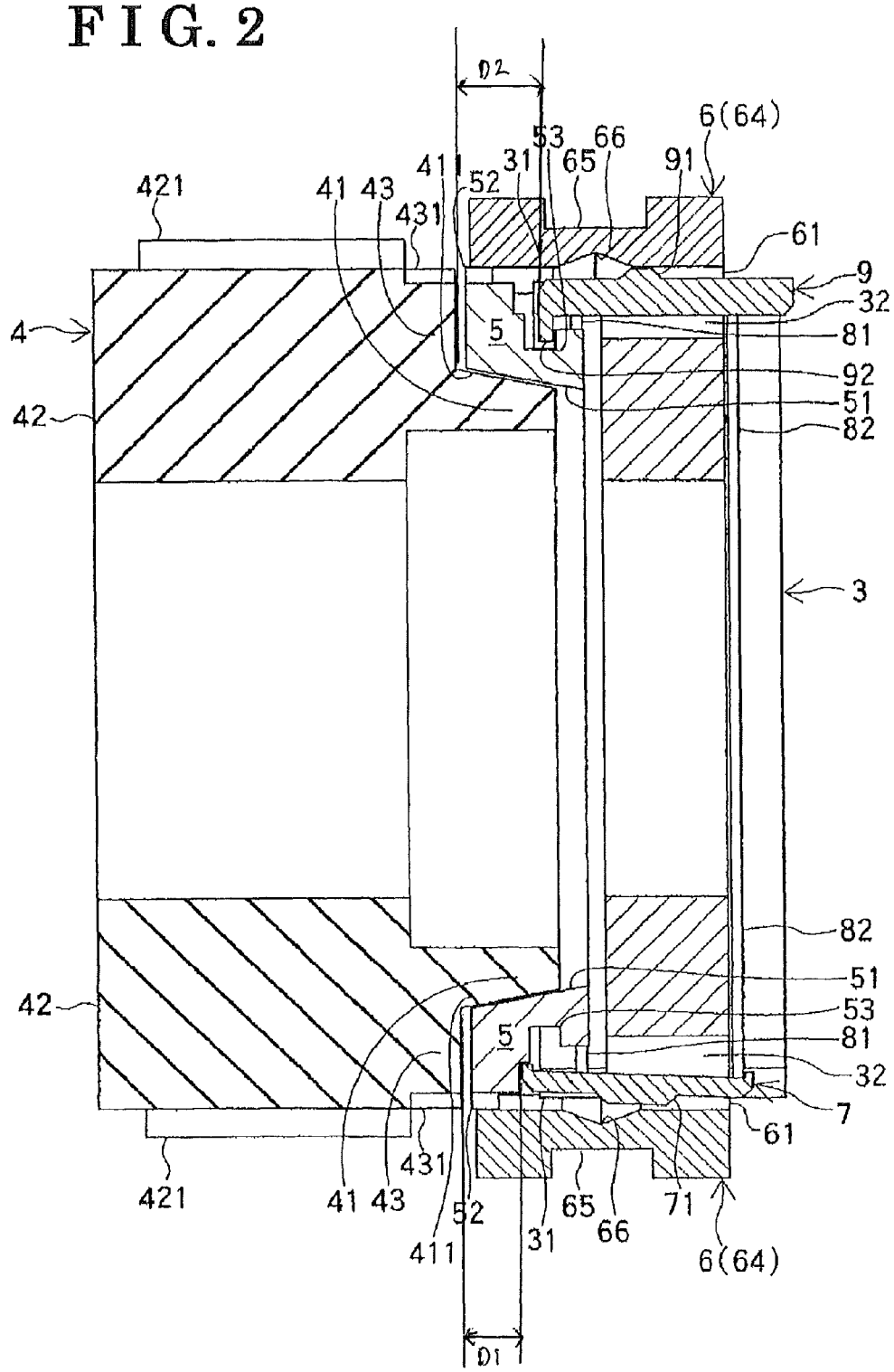
FIG. 2 is a diagram illustrating a state where a sleeve of the power transmission apparatus according to FIGS. 1A and 1B is in a synchronizing position.

Embodiment of a power transmission apparatus will be described hereinafter with reference to FIGS. 1A to 4. The power transmission apparatus according to the embodiments is mounted on a vehicle. An "axial direction" referred to hereinafter corresponds to an axial direction of a rotational shaft, while a "circumferential direction" referred to hereinafter corresponds to a circumferential direction of the rotational shaft, and a "radial direction" referred to hereinafter corresponds to a radial direction of the rotational shaft. Further, components possessing substantially the same structure will be indicated with the same reference numerals in each embodiment described below.

First Embodiment

As illustrated in FIGS. 1A and 1B, a power transmission apparatus 11 according to a first embodiment includes a rotational shaft 2, a clutch hub (a first power transmitting member) 3, a gear (a second power transmitting member) 4, a synchronizer ring 5, a sleeve 6, synchronizer keys 7 and pull keys (a drag restricting member) 9.

The rotational shaft 2 rotates when a power of an internal combustion engine, provided at an outside of the power transmission apparatus 11, is transmitted to the rotational shaft 2.

The clutch hub 3, fixed to an outer circumferential surface of the rotational shaft 2, rotates integrally with the rotational shaft 2. The clutch hub 3 includes clutch hub engagement teeth 31 (a first engagement toothed portion) at an outer circumferential surface thereof.

The gear 4 includes a conical portion 41, a gear main body 42 and a sleeve engaging portion 43. The gear 4 is rotatably held at the rotational shaft 2 via a bearing. According to the first embodiment, the gear 4 is arranged only at one side of the clutch hub 3 in the axial direction (i.e. a left side in FIG. 1A). The tapered-shaped conical portion 41 is provided at a side of the gear 4 facing the clutch hub 3 so as to protrude toward the clutch hub 3 (i.e., the conical portion 41 is formed at one end of the gear 4 and protruding so as to face the clutch hub 3), in a manner where a radius of an outer circumferential surface 411 of the conical portion 41 decreases toward the clutch hub 3 (i.e., a radius of one end of the outer circumferential surface 411 facing the clutch hub 3 is set to be smaller than a radius of the other end thereof in the axial direction). The gear main body 42 includes engagement teeth 421 at an outer circumferential surface thereof. The engagement teeth 421 constantly engage with engagement teeth of a counter gear, which is integrally rotatably held at another rotational shaft arranged in parallel with the rotational shaft 2. The sleeve engaging portion 43 is formed between the conical portion 41 and the gear main body 42 in the axial direction, and the sleeve engaging portion 43 includes gear engagement teeth 431 (a second engagement toothed portion) at an outer circumferential surface thereof.

The synchronizer ring 5 is arranged between the clutch hub 3 and the gear 4 so as to be movable therebetween relative to the clutch hub 3 and the gear 4 in the axial direction, and so as to be rotatable relative to the clutch hub 3 and the gear 4. The synchronizer ring 5 includes a cup-shaped inner circumferential surface 51, synchronizer ring engagement teeth 52 (a third engagement toothed portion) and a drag restricting engagement portion 53. The cup-shaped inner circumferential surface 51 is formed so that a radius thereof increases from the clutch hub 3 toward the gear 4 (i.e., a radius of one end of the cup-shape inner circumferential surface 51 facing the clutch hub 3 is set to be smaller than a radius of the other end thereof facing the gear 4). The cup-shaped inner circumferential surface 51 frictionally engages with the outer circumferential surface 411 of the conical portion 41 of the gear 4. The synchronizer ring engagement teeth 52 are formed at a side of an outer circumferential surface of the synchronizer ring 5 facing the gear 4, and the synchronizer ring engagement teeth 52 engage with sleeve engagement teeth 61 (a fourth engagement toothed portion) of the sleeve 6. The drag restricting engagement portion 53 engages with synchronizer ring engagement portions 92 of the pull keys 9 (described later). The drag restricting engagement portion 53 is a substantially groove-shaped recess, formed at a portion of the synchronizer ring 5 between the synchronizer ring engagement teeth 52 and the clutch hub 3 so as to extend around an entire outer circumference of the synchronizer ring 5 (alternatively, the drag restricting engagement portion 53 is a protrusion, which protrudes in a radially outward direction from an end portion of the synchronizer ring 5 facing the clutch hub 3, so as to extend around the entire outer circumference of the synchronizer ring 5).

The sleeve 6, formed into a substantially cylindrical-shape, is held by the clutch hub 3 at the outer circumferential surface thereof to be slidable in the axial direction. The sleeve 6 includes the sleeve engagement teeth 61, which are engageable with the clutch hub engagement teeth 31, the synchronizer ring engagement teeth 52 and the gear engagement teeth 431, respectively, at an inner circumferential surface thereof. The sleeve 6 slides in the axial direction from a neutral position 62 to an engagement position 63 via a synchronizing position 64. When the sleeve 62 is in the neutral position 62, the sleeve engagement teeth 61 engage with neither the synchronizer ring engagement teeth 52 nor the gear engagement teeth 431, but the sleeve engagement teeth 61 engage with the clutch hub engagement teeth 31. When the sleeve 62 is in the engagement position 63, the sleeve engagement teeth 61 engage with the clutch hub engagement teeth 31, the synchronizer ring engagement teeth 52 and the gear engagement teeth 431. When the sleeve 6 is in the synchronizing position 64, which is between the neutral position 62 and the engagement position 63, the sleeve 6 starts to thrust the synchronizer keys 7 (described later) toward the gear 4, the sleeve engagement teeth 61 engage with the clutch hub engagement teeth 31 and the synchronizer ring engagement teeth 52, and the clutch hub 3, the synchronizer ring 5 and the gear 4 synchronously rotate (i.e., the clutch hub 3, the synchronizer ring 5 and the gear 4 are synchronized). The sleeve 6 slides in the axial direction in response to an operation of a gear lever via a fork, engaged with a fork engagement groove, formed at an outer circumferential surface of the sleeve 6.

The sleeve 6 includes key engagement portions 66, recessed in a radially outward direction, at portions of the sleeve engagement teeth 61.

The synchronizer keys 7 are arranged between the outer circumferential surface of the clutch hub 3 and the inner circumferential surface of the sleeve 6 to be respectively within three of six key grooves 32, respectively formed at six portions of the clutch hub 3, so as to be movable in the axial direction relative to the sleeve 6 but so as not to be rotatable relative to the sleeve 6. The three synchronizer keys 7 are arranged to be substantially equally spaced away from each other in the circumferential direction. Each of the synchronizer keys 7 is thrust from an inner circumferential surface thereof toward the inner circumferential surface of the sleeve 6 in the radially outward direction, at an end portions thereof in the axial direction by means of a first C spring (a first key-biasing member) 81 and a second C spring (a second key-biasing member) 82. Each of the synchronizer keys 7 includes a synchronizer sleeve engaging portion 71, protruding from a portion of a surface of the synchronizer key 7 facing the sleeve 6 in the radially outward direction so as to engage with the key engagement portion 66 of the sleeve 6.

The pull keys 9 are arranged between the outer circumferential surface of the clutch hub 3 and the inner circumferential surface of the sleeve 6 to be respectively within three of the six key grooves 32, respectively formed at the six portions of the clutch hub 3, so as to be movable in the axial direction relative to the sleeve 6 but so as not to be rotatable relative to the sleeve 6. The three pull keys 9 are respectively arranged within the key grooves 32, other than the key grooves 32, in which the synchronizer rings 7 are arranged, so as to be equally spaced away from each other in the circumferential direction. As illustrated in FIG. 1B, the pull keys 9 and the synchronizer keys 7 are alternately arranged in the circumferential direction. Each of the pull keys 9 is thrust from an inner circumferential surface thereof toward the inner circumferential surface of the sleeve 6 in the radially outward direction, at end portions thereof in the axial direction by means of the first and second C springs 81 and 82. Each of the pull keys 9 includes a pull sleeve engaging portion 91, protruding from a portion of a surface of the pull key 9 facing the sleeve 6 in the radially outward direction in order to engage with the key engagement portion 66 of the sleeve 6. Each of the pull keys 9 further includes the synchronizer ring engaging portion 92, protruding in a radially inward direction from an end portion of the pull key 9 facing the gear 4.

In the power transmission apparatus 11 according to the first embodiment, when the sleeve 6 is in the neutral position 62 (see FIG. 1A), the synchronizer ring 5 rotates relative to the clutch hub 3 (the sleeve 6) and the gear 4 (i.e., the synchronizer ring 5 is in an idly rotating state). Further, the synchronizer sleeve engaging portions 71 of the synchronizer keys 7 and the pull sleeve engaging portions 91 of the pull keys 9 engage with the corresponding key engagement portions 66 of the sleeve 6. Furthermore, the synchronizer ring engaging portions 92 of the pull keys 9 engage with the drag restricting engagement portion 53 of the synchronizer ring 5. When the sleeve 6 is in the neutral position 62, movement of the synchronizer keys 7 and the pull keys 9 in the axial direction is restricted. Therefore, movement of the synchronizer ring 5, whose drag restricting engagement portion 53 engages with the synchronizer ring engaging portions 92 of the pull keys 9, in the axial direction is restricted. In other words, the synchronizer ring 5 idly rotates in a state where the synchronizer ring 5 is pulled toward the clutch hub 3 by means of the pull keys 9. Consequently, contact between the cup-shaped inner circumferential surface 51 of the synchronizer ring 5 and the outer circumferential surface 411 of the conical portion 41 is restrained, and as a result, torque loss, wearing out and seizure are restrained.

An operation for synchronizing rotation of the clutch hub 3 and the gear 4 in the power transmission apparatus 11 according to the first embodiment will be described hereinafter. The sleeve 6 slides from the neutral position 62 toward the gear 4 in the axial direction while the sleeve 6 thrust the synchronizer keys 7 and the pull keys 9, which engage with the corresponding key engagement portions 66 of the sleeve 6, toward the gear 4 in the axial direction. Subsequently, when the sliding movement of the sleeve 6 progresses and the sleeve 6 is in the synchronizing position 64, the synchronizer keys 7 start to thrust the synchronizer ring 5 toward the gear 4. The movement of the synchronizer keys 7 in the axial direction stops when the synchronizer keys 7 contact a groove, formed at the outer circumferential surface of the synchronizer ring 5. When the pull keys 9 move toward the gear 4, the synchronizer ring 5 is thrust toward the gear 4 (i.e., the synchronizer ring 5 is thrust so as to move in the axial direction), and therefore the engagement between the synchronizer ring engaging portions 92 of the pull keys 9 and the drag restricting engagement portion 53 of the synchronizer ring 5 is not released. Subsequently, as illustrated in FIG. 2, the cup-shaped inner circumferential surface 51 of the synchronizer ring 5 and the outer circumferential surface 411 of the conical portion 41 of the gear 4 start to frictionally engage with each other, thereby the sleeve engagement teeth 61 of the sleeve 6 and the synchronizer ring engagement teeth 52 engage with each other. At that time, the synchronizer sleeve engaging portions 71 of the synchronizer keys 7 and the pull sleeve engaging portions 91 of the pull keys 9 disengage from the corresponding key engagement portions 66 of the sleeve 6, and are thrust in the radially inward direction against biasing force of the first and second C springs 81 and 82. The drag restricting engagement portion 53 of the synchronizer ring 5 is formed so as to be sufficiently recessed to generate a clearance between the inner end of each of the synchronizer ring engaging portions 92 and the drag restricting engagement portion 53 in order to allow the synchronizer ring engaging portions 92 of the pull keys 9, which are thrust in the radially inward direction, to move in the radially inward direction, therefore, the synchronizer ring engaging portions 92 do not interfere with the rotation of the synchronizer ring 5.

Figure 3:
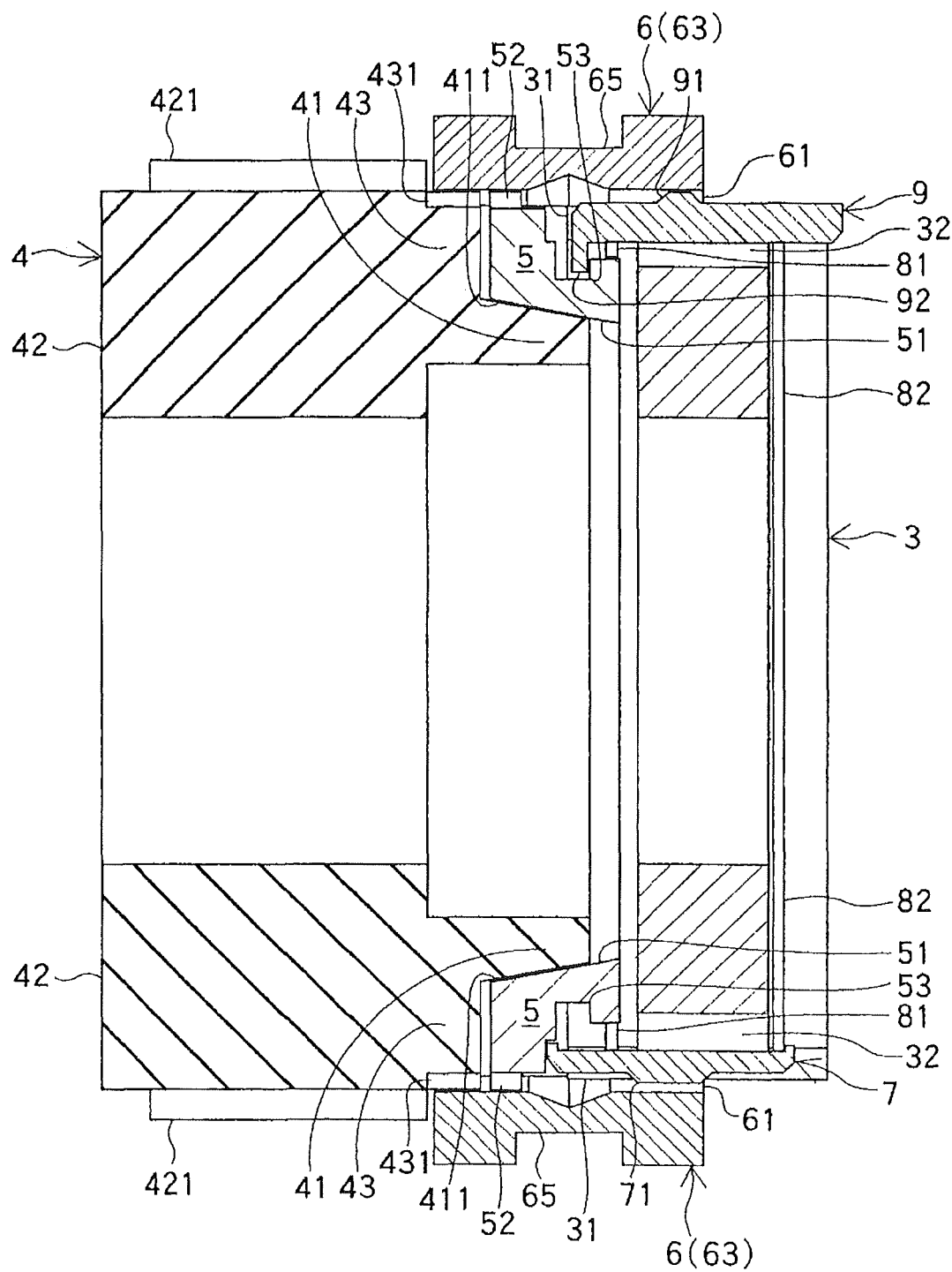
FIG. 3 is a diagram illustrating a state where the sleeve of the power transmission apparatus according to FIGS. 1A and 1B is in a engagement position.

After the rotations of the clutch hub 3 (the sleeve 6), the synchronizer ring 5 and the gear 4 are synchronized when the sleeve 6 is in the synchronizing position 64, the sleeve 6 further slides toward the gear 4 in the axial direction, so that the sleeve engagement teeth 61 of the sleeve 6 engage with the gear engagement teeth 431 of the sleeve engaging portion 43 of the gear 4 (see FIG. 3). In other words, the synchronization of the power transmission apparatus 11 is completed, and subsequently, the sleeve engagement teeth 61 engage with the clutch hub engagement teeth 31, the synchronizer ring engagement teeth 52 and the gear engagement teeth 431 when the sleeve 6 is in the engagement position 63.

In the power transmission apparatus 11 according to the first embodiment, when the synchronizer ring 5 idly rotates, the movement of the synchronizer ring 5 toward the gear 4 is restricted by means of the pull keys 9. Therefore, the contact between the cup-shaped inner circumferential surface 51 of the synchronizer ring 5 and the outer circumferential surface 411 of the conical portion 41 is restrained, and as a result, torque loss, wearing out, and seizure are restrained. Further, when synchronizing operation is performed, the pull keys 9 do not interfere with the synchronizing operation.

Further, modification of the synchronizer ring 5 is required only in a shape thereof for engaging the pull keys 9. Therefore, substantial modification of the shape of the entire power transmission device is not required. Furthermore, the pull keys 9 are respectively arranged at the same positions as the positions where the synchronizer keys 7 are arranged (i.e., both of the synchronizer keys 7 and the pull keys 9 are respectively arranged between the outer circumferential surface of the clutch hub 3 and the inner circumferential surface of the sleeve 6, though the synchronizer keys 7 and the pull keys 9 are respectively arranged at the different positions in the circumferential direction). In addition, the shape of the pull keys 9 is similar to that of the synchronizer keys 7. Accordingly, the pull keys 9 may be assembled in a manner similar to the synchronizer keys 7, and therefore the pull keys 9 are easily assembled.

The three pull keys 9 are respectively arranged to be equally spaced away from each other in the circumferential direction. Therefore, the synchronizer ring 5 is stably held by the pull keys 9, and as a result, the synchronizer ring 5 is restrained from inclining. Accordingly, the contact between the cup-shaped inner circumferential surface 51 of the synchronizer ring 5 and the outer circumferential surface 411 of the conical portion 41 of the gear 4 is surely restrained.

Second Embodiment

A detailed description of the power transmission apparatus 11 according to a second embodiment will be provided hereinafter with reference to FIGS. 4 to 7. A structure and effects of the power transmission apparatus 11 according to the second embodiment are similar to the first embodiment. Therefore, only different portions will be described mainly hereinafter.

The power transmission apparatus 11 according to the second embodiment includes pull keys 90 (a drag restricting member), in which the synchronizer keys 7 and the pull keys 9 of the power transmission apparatus 11 according to the first embodiment are integrated. The pull keys 90 are arranged between the outer circumferential surface of the clutch hub 3 and the inner circumferential surface of the sleeve 6 to be respectively within the three key grooves 32, respectively formed at three portions of the clutch hub 3, so as to be movable in the axial direction relative to the sleeve 6 but so as not to be rotatable relative to the sleeve 6. The three pull keys 90 are arranged to be equally spaced away from each other in the circumferential direction. Each of the pull keys 90 is thrust from an inner circumferential surface thereof toward the inner circumferential surface of the sleeve 6 in the radially outward direction, at end portions thereof in the axial direction by means of the first and second C springs 81 and 82. Each of the pull keys 90 includes a pull sleeve engaging portion 910, protruding from a portion of a surface of the pull key 90 facing the sleeve 6 in the radially outward direction in order to engage with the key engagement portion 66 of the sleeve 6. Each of the pull keys 9 further includes a synchronizer ring engaging portion 920, protruding in a radially inward direction from an end portion of the pull key 90 facing the gear 4.

Figure 4:
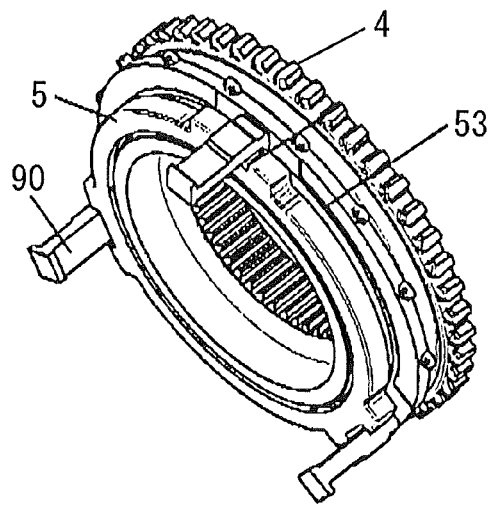
FIG. 4 is a perspective view illustrating a portion of a power transmission apparatus according to a second embodiment in a state where pull keys and a synchronizer ring are engaged.
Figure 5:
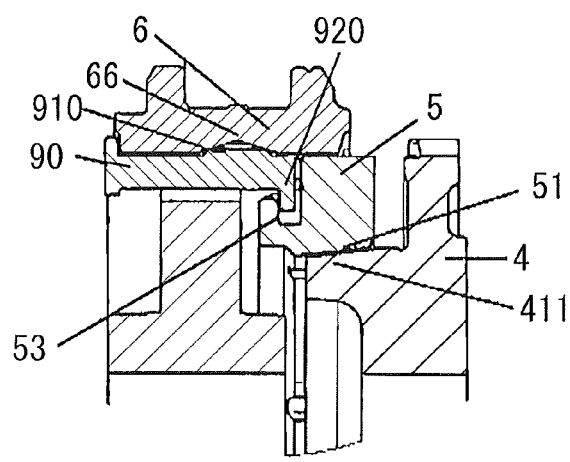
FIG. 5 is a diagram illustrating a state where the sleeve of the power transmission apparatus according to the second embodiment is in a neutral position.
Figure 6:
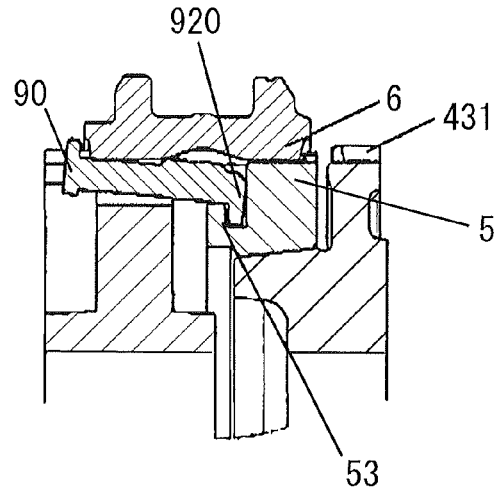
FIG. 6 is a diagram illustrating a state where the sleeve of the power transmission apparatus according to the second embodiment is in the synchronizing position.
Figure 7:
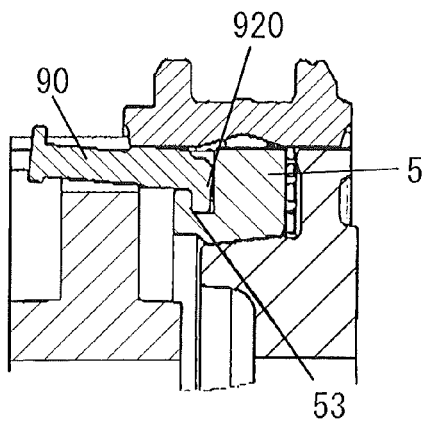
FIG. 7 is a diagram illustrating a state where the sleeve of the power transmission apparatus according to the second embodiment is in the engagement position.
Figure 8:
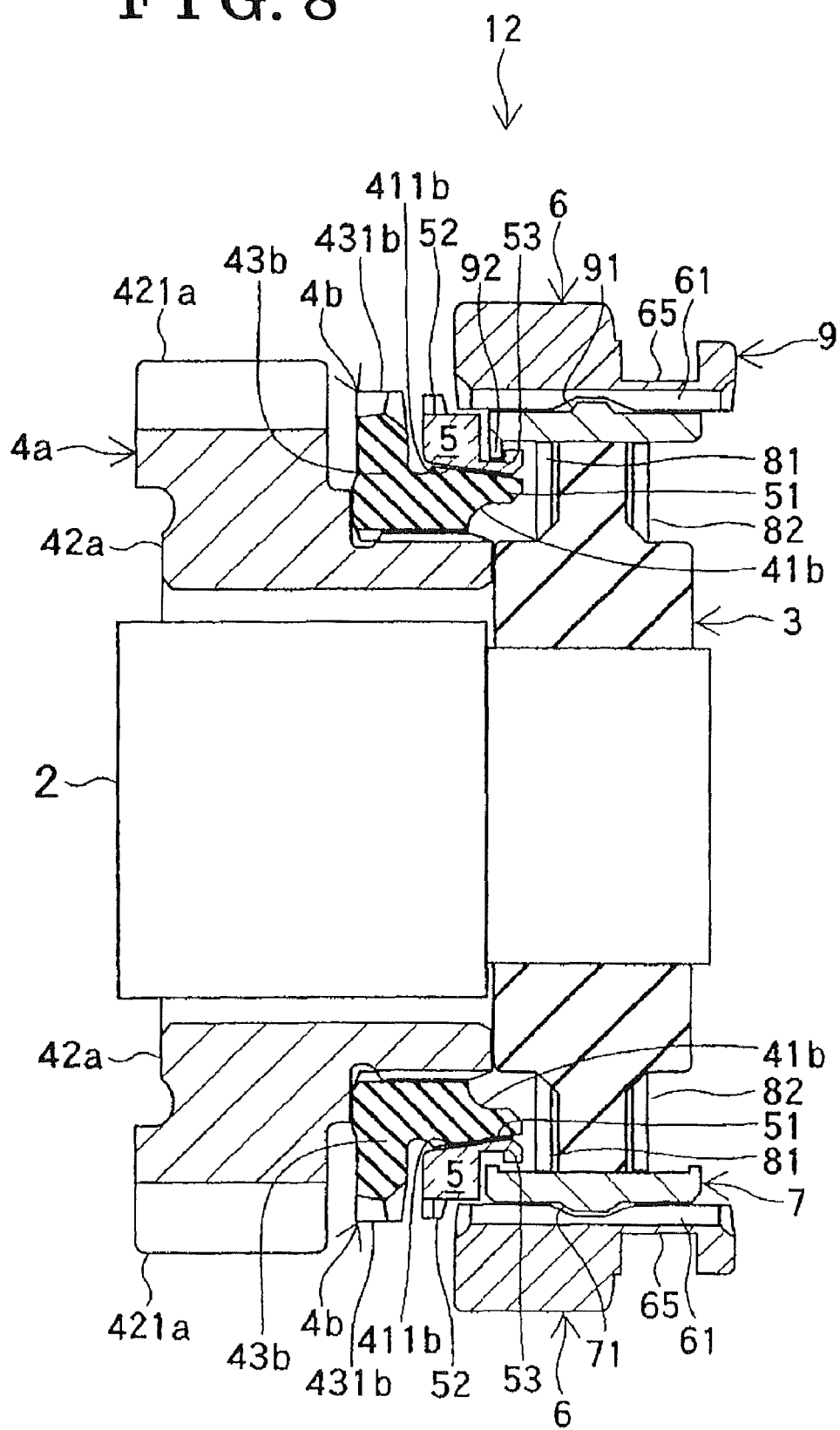
FIG. 8 is an explanation diagram illustrating a portion of a cross-section of a power transmission apparatus according to a modified embodiment.

In the power transmission apparatus 11 according to the second embodiment, when the sleeve 6 is in the neutral position 62, the synchronizer ring 5 rotates relative to the clutch hub 3 (the sleeve 6) and the gear 4 (i.e., the synchronizer ring 5 is in the idly rotating state). Further, the pull sleeve engaging portions 910 of the pull keys 90 engage with the corresponding key engagement portions 66 of the sleeve 6. Furthermore, as illustrated in FIGS. 4 and 5 the synchronizer ring engaging portions 920 of the pull keys 90 engage with the drag restricting engagement portion 53 of the synchronizer ring 5. When the sleeve 6 does not move in the axial direction, the movement of the pull keys 90 in the axial direction is restricted. Therefore, the movement of the synchronizer ring 5, whose drag restricting engagement portion 53 engages with the synchronizer ring engaging portions 920 of the pull keys 90, in the axial direction is restricted. In other words, the synchronizer ring 5 idly rotates in the state where the synchronizer ring 5 is pulled toward the clutch hub 3 by means of the pull keys 90. Consequently, the contact between the cup-shaped inner circumferential surface 51 of the synchronizer ring 5 and the outer circumferential surface 411 of the conical portion 41 is restrained, and as a result, torque loss, wearing out and seizure are restrained.

An operation for synchronizing rotation of the clutch hub 3 and the gear 4 in the power transmission apparatus 11 according to the second embodiment will be described hereinafter. The sleeve 6 slides from the neutral position 62 toward the gear 4 in the axial direction while the sleeve 6 thrust the pull keys 90, which engage with the corresponding key engagement portions 66 of the sleeve 6, toward the gear 4 in the axial direction. Subsequently, when the sliding movement of the sleeve 6 progresses and the sleeve 6 is in the synchronizing position 64, the pull keys 90 start to thrust the synchronizer ring 5 toward the gear 4. Because the pull keys 90 and the synchronizer ring 5 move toward the gear 4 synchronously, the engagement between the synchronizer ring engaging portions 920 of the pull keys 90 and the drag restricting engagement portion 53 of the synchronizer ring 5 is not released. Subsequently, the cup-shaped inner circumferential surface 51 of the synchronizer ring 5 and the outer circumferential surface 411 of the conical portion 41 of the gear 4 start to frictionally engage with each other, thereby the sleeve engagement teeth 61 of the sleeve 6 and the synchronizer ring engagement teeth 52 engage with each other. At that time, the pull sleeve engaging portions 910 of the pull keys 90 disengage from the corresponding key engagement portions 66 of the sleeve 6, and are thrust in the radially inward direction against the biasing force of the first and second C springs 81 and 82. The drag restricting engagement portion 53 of the synchronizer ring 5 is formed so as to be sufficiently recessed to generate a clearance between the inner end of each of the synchronizer ring engaging portions 92 and the drag restricting engagement portion 53 in order to allow the synchronizer ring engaging portions 92 of the pull keys 9, which are thrust in the radially inward direction, to move in the radially inward direction, therefore, the synchronizer ring engaging portions 92 do not interfere with the rotation of the synchronizer ring 5.

After the rotation of the clutch hub 3 (the sleeve 6), the synchronizer ring 5 and the gear 4 is synchronized in the synchronizing position 64 of the sleeve 6, the sleeve 6 further slides toward the gear 4 in the axial direction, so that the sleeve engagement teeth 61 of the sleeve 6 engage with the gear engagement teeth 431 of the sleeve engaging portion 43 of the gear 4. In other words, the synchronizing of the power transmission apparatus 11 is completed, and subsequently, the sleeve engagement teeth 61 engage with the clutch hub engagement teeth 31, the synchronizer ring engagement teeth 52 and the gear engagement teeth 431 when the sleeve 6 is in the engagement position 63. At that time, the cup-shaped inner circumferential surface 511 of the synchronizer ring 5 and the outer circumferential surface 411 of the conical portion 41 contact each other. Therefore, the pull keys 90 are not further moved toward the gear 4, and are thrust in the radially inward direction against biasing force of the first and second C springs 81 and 82 along inner surfaces of the corresponding key engagement portions 66 of the sleeve 6. Because a length of the recess of the drag restricting engagement portion 53 of the synchronizer ring 5 is set to be longer than a length of the protrusion of the synchronizer ring engaging portions 920 of the pull keys 90 in the radial direction, the synchronizer ring engaging portions 920 do not interfere with the rotation of the synchronizer ring 5.

In the power transmission apparatus 11 according to the second embodiment, when the synchronizer ring 5 idly rotates, the movement of the synchronizer ring 5 toward the gear 4 is restricted by means of the pull keys 90. Therefore, the contact between the cup-shaped inner circumferential surface 51 of the synchronizer ring 5 and the outer circumferential surface 411 of the conical portion 41 is restrained, and as a result, torque loss, wearing out and seizure are restrained.

The pull keys 90 in the power transmission apparatus 11 according to the second embodiment are integration of conventional synchronizer keys with the pull keys 9 according to the first embodiment, in which a function of the pull keys 9 according to the first embodiment is added to the conventional synchronizer keys. Therefore, the number of components does not increase, and the pull keys 90 are easily assembled.

Modified embodiment of the First and Second Embodiments

In the power transmission apparatus 11 according to the first and second embodiments, the conical portion 41 and the sleeve engaging portion 43 are integrally provided with the gear 4. However, as illustrated in FIG. 4, a gear piece 4b, which corresponds to the conical portion 41 and the sleeve engaging portion 43 according to the first and second embodiments, may be provided separately from the gear 4. A power transmission apparatus 12 according to the modified embodiment includes substantially the same structure and the effects as that of the power transmission apparatus 11 according to the first embodiment. Therefore, only different portions will be described mainly hereinafter.

A gear 4a of the power transmission apparatus 12 according to the modified embodiment includes a gear main body 42a. The gear main body 42a includes engagement teeth 421a at an outer circumferential surface thereof. The engagement teeth 421a constantly engage with the engagement teeth of the counter gear, which is integrally rotatably held at another rotational shaft arranged in parallel with the rotational shaft 2. The gear piece 4b includes a conical portion 41b and a sleeve engaging portion 43b. The conical portion 41b and the sleeve engaging portion 43b of the gear piece 4b are connected to an outer circumferential surface of the gear 4a at a side thereof facing the clutch hub 3 in the axial direction, so as to rotate integrally with the gear 4a. The conical portion 41b is provided at the side of the gear 4a facing the clutch hub 3. An outer circumferential surface of the conical portion 41b is formed into a tapered-shape, in which a radius thereof is decreased toward the clutch hub 3. The sleeve engaging portion 43b is provided between the conical portion 41b and the gear main body 42a of the gear 4a. The sleeve engaging portion 43b includes gear engagement teeth 431b, which are engageable with the sleeve engagement teeth 61 of the sleeve 6, at an outer circumferential surface thereof.

Other Embodiments

The embodiments of the power transmission apparatus 11 and 12 are described above, though not limited to the above-described embodiments. In the descriptions of the power transmission apparatus 11 according to the first and second embodiments, and the power transmission apparatus 12 according to the modified embodiment of the first and second embodiments, the gear 4 (the gear 4a and the gear piece 4b) is arranged at one side of the clutch hub 3 in the axial direction. However, the pull keys 9 (the pull keys 90) (the drag restricting member) may be adapted to a power transmission apparatus in which the gears 4 (the gear 4a and the gear piece 4b) are arranged at both sides of the clutch hub 3 in the axial direction. Each of the pull keys 9 (the pull keys 90) includes the synchronizer ring engaging portion 92 (the synchronizer ring engaging portions 920) at one end thereof in the axial direction. A plurality of pull keys 9 (a plurality of pull keys 90) is arranged at the clutch hub 3 to be aligned in the circumferential direction. First half of the pull keys 9 (the pull keys 90) are arranged so that the synchronizer ring engaging portions 92 (the synchronizer ring engaging portions 920) thereof are positioned at one side in the axial direction, while the second half of the pull keys 9 (the pull keys 90) are arranged so that the synchronizer ring engaging portions 92 (the synchronizer ring engaging portions 920) thereof are positioned at the other side in the axial direction. Each of the pull keys 9 (the pull keys 90) engages with one of the drag-preventing engagement portions 53 of the synchronizer rings 5, which are arranged at both sides of the pull keys 9 (the pull keys 90) in the axial direction. When the synchronization is performed among the clutch hub 3 (the sleeve 6), the synchronizer ring 5 and the gear 4 (the gear 4a and the gear piece 4b), which is arranged at a side where the synchronizer ring engaging portions 92 (the synchronizer ring engaging portions 920) of first half of the pull keys 9 (the pull keys 90) are not provided, the first half of the pull keys 9 (the pull keys 90) are thrust toward the gear 4 (the gear 4a and the gear piece 4b), which is arranged at the side where the synchronizer ring engaging portions 92 (the synchronizer ring engaging portions 920) of the first half of the pull keys 9 (the pull keys 90) are not provided, in response to the sliding movement of the sleeve 6 in the axial direction. However, the first half of the pull keys 9 (the pull keys 90) engage with the synchronizer ring 5, which is arranged at the different side from a moving direction of the sleeve 6. Therefore, the first half of the pull keys 9 (the pull keys 90) does not move toward the gear 4 (the gear 4a and the gear piece 4b), which is arranged at the side of a moving direction of the sleeve 6, and the pull sleeve engaging portions 91 (the pull sleeve engaging portions 910) of the first half of the pull keys 9 (the pull keys 90) disengage from the corresponding key engagement portions 61 of the sleeve 6. Consequently, the first half of the pull keys 9 (the pull keys 90) are thrust in the radially inward direction against the biasing force of the first and second C springs 81 and 82. Accordingly, the pull keys 9 (the pull keys 90) do not interfere with the synchronizing operation by means of the synchronizer ring 5, with which the first half of the pull keys 9 (the pull keys 90) does not engage. Thus, the pull keys 9 (the pull keys 90) according to the first and second embodiments and the modified embodiment of the first and second embodiments may be adapted to the power transmission apparatus in which the gears 4 (the gear 4a and the gear piece 4b) are arranged at both sides of the clutch hub 3 in the axial direction.

Further, the drag restricting members according to the first and second embodiments and the modified embodiment of the first and second embodiments may be adapted to a shift mechanism having a synchronizer ring (a synchronizing device), in which a driving mode of a vehicle is shifted from a two-wheel drive to a four-wheel drive.

Accordingly, the pull keys 9 are provided between the outer circumferential surface of the clutch hub 3 and the inner circumferential surface of the sleeve 6 in the same manner where the synchronizer keys 7, used when the power transmission apparatus 11 (the power transmission apparatus 12) performs synchronizing operation, are provided between the outer circumferential surface of the clutch hub 3 and the inner circumferential surface of the sleeve 6. The synchronizer ring engaging portions 92 of the pull keys 9 engage with the drag restricting engagement portion 53 of the synchronizer ring 5. Therefore, the synchronizer ring 5 is not movable between the clutch hub 3 and the gear 4 (the gear 4a) unless the pull keys 9 move relative to the clutch hub 3. In other words, the pull keys 9 as well as the synchronizer keys 7 move toward the gear 4 (the gear 4a) when the synchronizing operation is being performed, and thereby the movement of the synchronizer ring 5 toward the gear 4 (the gear 4a) is allowed. In the neutral position where the synchronizing operation is not being performed, the pull keys 9 hold the synchronizer ring 5 toward the clutch hub 3. Therefore, when the synchronizer ring 5 idly rotates, the movement of the synchronizer ring 5 toward the gear 4 (the gear 4*a*) is restricted, and the contact between the cup-shaped inner circumferential surface 51 of the synchronizer ring 5 and the outer circumferential surface 411 of the conical portion 41 of the gear 4 (the gear 4*a*) is restrained. As a result, torque loss, wearing out and seizure are restrained.

Further, modification of the synchronizer ring 5 is required only in a shape thereof for engaging the pull keys 9 (the pull keys 90). Therefore, substantial modification of the shape of the synchronizer ring 5 is not required. Furthermore, the pull keys 9 (the pull keys 90) are respectively arranged at similar positions to the positions where the synchronizer keys 7 are arranged. In addition, the shape of the pull keys 9 (the pull keys 90) is similar to that of the synchronizer keys 7. Accordingly, the pull keys 9 may be assembled in a manner similar to the synchronizer keys 7, and therefore the pull keys 9 are easily assembled.

Accordingly, the pull keys 9, having a function of conventional synchronizer keys 7 applied to a conventional power transmission apparatus, are arranged between the outer circumferential surface of the clutch hub 3 and the inner circumferential surface of the sleeve 6. The synchronizer ring engaging portions 92 (the synchronizer ring 920) of the pull keys 9 (the pull keys 90) engage with the drag restricting engagement portion 53 of the synchronizer ring 5. Therefore, the synchronizer ring 5 is not movable between the clutch hub 3 and the gear 4 (the gear 4*a*) unless the pull keys 9 (the pull keys 90) move relative to the clutch hub 3. In other words, the pull keys 9 (the pull keys 90) as well as the synchronizer keys 7 move toward the gear 4 (the gear 4*a*) when the synchronizing operation is being performed, and thereby the movement of the synchronizer ring 5 toward the gear 4 (the gear 4*a*) is allowed. In the neutral position where the synchronizing operation is not being performed, the pull keys 9 (the pull keys 90) hold the synchronizer ring 5 toward the clutch hub 3. Therefore, when the synchronizer ring 5 idly rotates, the movement of the synchronizer ring 5 toward the gear 4 (the gear 4*a*) is restricted, and the contact between the cup-shaped inner circumferential surface 51 of the synchronizer ring 5 and the outer circumferential surface 411 of the conical portion 41 of the gear 4 (the gear 4*a*) is restrained. As a result, torque loss, wearing out and seizure are restrained.

The pull keys 9 (the pull keys 90) include the function of the synchronizer keys 7. Therefore, the pull keys 9 (the pull keys 90) may be arranged instead of the synchronizer keys 7, and the number of the components is not increased. Further, the shape of the pull keys 9 (the pull keys 90) is similar to that of the synchronizer keys 7. Therefore, the pull keys 9 (the pull keys 90) may be assembled in a manner similar to the synchronizer keys 7, and accordingly the pull keys 9 (the pull keys 90) are easily assembled.

Further, the modification of the synchronizer ring 5 is required only in the shape thereof for engaging the pull keys 9 (the pull keys 90). Therefore, substantial modification of the shape of the synchronizer ring 5 is not required.

According to the first and second embodiments and the modified embodiment of the first and second embodiments, two or more of the pull keys 9 (the pull keys 90) are arranged so as to be equally spaced away from each other in a circumferential direction of the clutch hub 3.

Accordingly, when the synchronizer ring 5 idly rotates, the synchronizer ring 5 stably rotates and inclination of the synchronizer ring 5 is restrained. Therefore, the contact between the cup-shaped inner circumferential surface 51 of the synchronizer ring 5 and the outer circumferential surface 411 of the conical portion 41 of the gear 4 (the gear 4*a*) is restrained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A power transmission apparatus comprising:
   a first power transmitting member having a first engagement toothed portion at an outer circumferential surface thereof;
   a second power transmitting member including a taper-shaped conical portion and a sleeve engaging portion, the conical portion arranged at a side of the second power transmitting member facing the first power transmitting member and protruding toward the first power transmitting member so that a radius of an outer circumferential surface of the conical portion is set to decrease toward the first power transmitting member, and the sleeve engaging portion having a second engagement toothed portion at an outer circumferential surface thereof;
   a synchronizer ring arranged between the first power transmitting member and the second power transmitting member so as to be axially movable therebetween relative to the first power transmitting member and the second power transmitting member, including a cup-shaped inner circumferential surface, whose radius is set so to increase from the first power transmitting member toward the second power transmitting member and frictionally engaging with the outer circumferential surface of the conical portion, and having a third engagement toothed portion at a portion of an outer circumferential surface of the synchronizer ring at a side thereof facing the second power transmitting member;
   a sleeve held at the first power transmitting member so as to be axially slidable relative to the first power transmitting member, and having a fourth engagement toothed portion at an inner circumferential surface thereof, the fourth engagement toothed portion engageable with the first engagement toothed portion of the first power transmitting member, the third engagement toothed portion of the synchronizer ring and the second engagement toothed portion of the second power transmitting member, respectively;
   a synchronizer key arranged between the outer circumferential surface of the first power transmitting member and the inner circumferential surface of the sleeve so as to be axially movable but not to be rotatable relative to the sleeve, being thrust from an inner circumferential surface thereof toward the inner circumferential surface of the sleeve in a radially outward direction by means of biasing force of a first key-biasing member and a second key-biasing member, axially moving toward the second power transmitting member so as to thrust the synchronizer ring toward the second power transmitting member in accordance with a axial movement of the sleeve from the first power transmitting member to the second power transmitting member on the basis of an operation of shifting shift stages, and being thrust in a radially inward direction against the biasing force of the first key-biasing member and the second key-biasing member by means of the sleeve after rotation of the first power transmitting member and the second power transmitting member is synchronized; and a drag restricting member arranged between the outer circumferential surface of the first power transmitting member and the inner circumferential surface of the sleeve so as to be axially movable relative to the sleeve while so as not to be rotatable relative to the sleeve, being thrust from an inner circumferential surface thereof toward the inner circumferential surface of the sleeve in the radially outward direction by means of the biasing force of the first key-biasing member and the second key-biasing member, wherein a synchronizer ring engaging portion is formed at a side of the drag restricting member facing the second power transmitting member so as to protrude in the radially inward direction, and a drag restricting engagement portion is formed at the outer circumferential surface of the synchronizer ring at a side thereof facing the first power transmitting member, the drag restricting engagement portion engaging the synchronizer ring engaging portion to pull the synchronizer ring.

2. The power transmission apparatus according to claim 1, wherein, two or more of the drag restricting members are arranged so as to be equally spaced away from each other in a circumferential direction of the first power transmitting member.

3. The power transmission apparatus according to claim 1, a first axial distance from the second power transmitting member to an axially facing surface of the synchronizer key closest to the second power transmitting member; and a second axial distance from the second power transmitting member to an axially facing surface of the drag restricting member closest to the second power transmitting member;

wherein the first distance is less than the second distance after the first power transmitting member and the second power transmitting member are synchronized.

4. A power transmission apparatus comprising:

a first power transmitting member having a first engagement toothed portion at an outer circumferential surface thereof;

a second power transmitting member including a taper-shaped conical portion and a sleeve engaging portion, the conical portion arranged at a side of the second power transmitting member facing the first power transmitting member and protruding toward the first power transmitting member so that a radius of an outer circumferential surface of the conical portion decreases toward the first power transmitting member, and the sleeve engaging portion having a second engagement toothed portion at an outer circumferential surface thereof;

a synchronizer ring arranged between the first power transmitting member and the second power transmitting member so as to be axially movable therebetween relative to the first power transmitting member and the second power transmitting member, including a cup-shaped inner circumferential surface, whose radius increases from the first power transmitting member toward the second power transmitting member and frictionally engaging with the outer circumferential surface of the conical portion, and having a third engagement toothed portion at a portion of an outer circumferential surface of the synchronizer ring facing the second power transmitting member; and a sleeve held at the first power transmitting member so as to be axially slidable relative to the first power transmitting member in an axial direction, and having a fourth engagement toothed portion at an inner circumferential surface thereof, the fourth engagement toothed portion engageable with the first engagement toothed portion of the first power transmitting member, the third engagement toothed portion of the synchronizer ring and the second engagement toothed portion of the second power transmitting member, respectively; and a drag restricting member arranged between the outer circumferential surface of the first power transmitting member and the inner circumferential surface of the sleeve so as to be axially movable but not to be rotatable relative to the sleeve, being thrust from an inner circumferential surface thereof toward the inner circumferential surface of the sleeve in a radially outward direction by means of biasing force of a first key-biasing member and a second key-biasing member, axially moving toward the second power transmitting member so as to thrust the synchronizer ring toward the second power transmitting member in accordance with a axial movement of the sleeve from the first power transmitting member to the second power transmitting member on the basis of an operation of shifting shift stages, and being thrust in a radially inward direction against the biasing force of the first key-biasing member and the second key-biasing member by means of the sleeve after rotation of the first power transmitting member and the second power transmitting member is synchronized, wherein a synchronizer ring engaging portion is formed at a side of the drag restricting member facing the second power transmitting member so as to protrude in the radially inward direction, and a drag restricting engagement portion is formed at the outer circumferential surface of the synchronizer ring at a side thereof facing the first power transmitting member, the drag restricting engagement portion engaging the synchronizer ring engaging portion to pull the synchronizer ring.

5. The power transmission apparatus according to claim 4, wherein, two or more of the drag restricting members are arranged so as to be equally spaced away from each other in a circumferential direction of the first power transmitting member.

* * * * *